April 28, 1931.  T. N. PIERSON  1,803,131
GRAIN SEPARATING MECHANISM
Filed Nov. 16, 1927   2 Sheets-Sheet 1
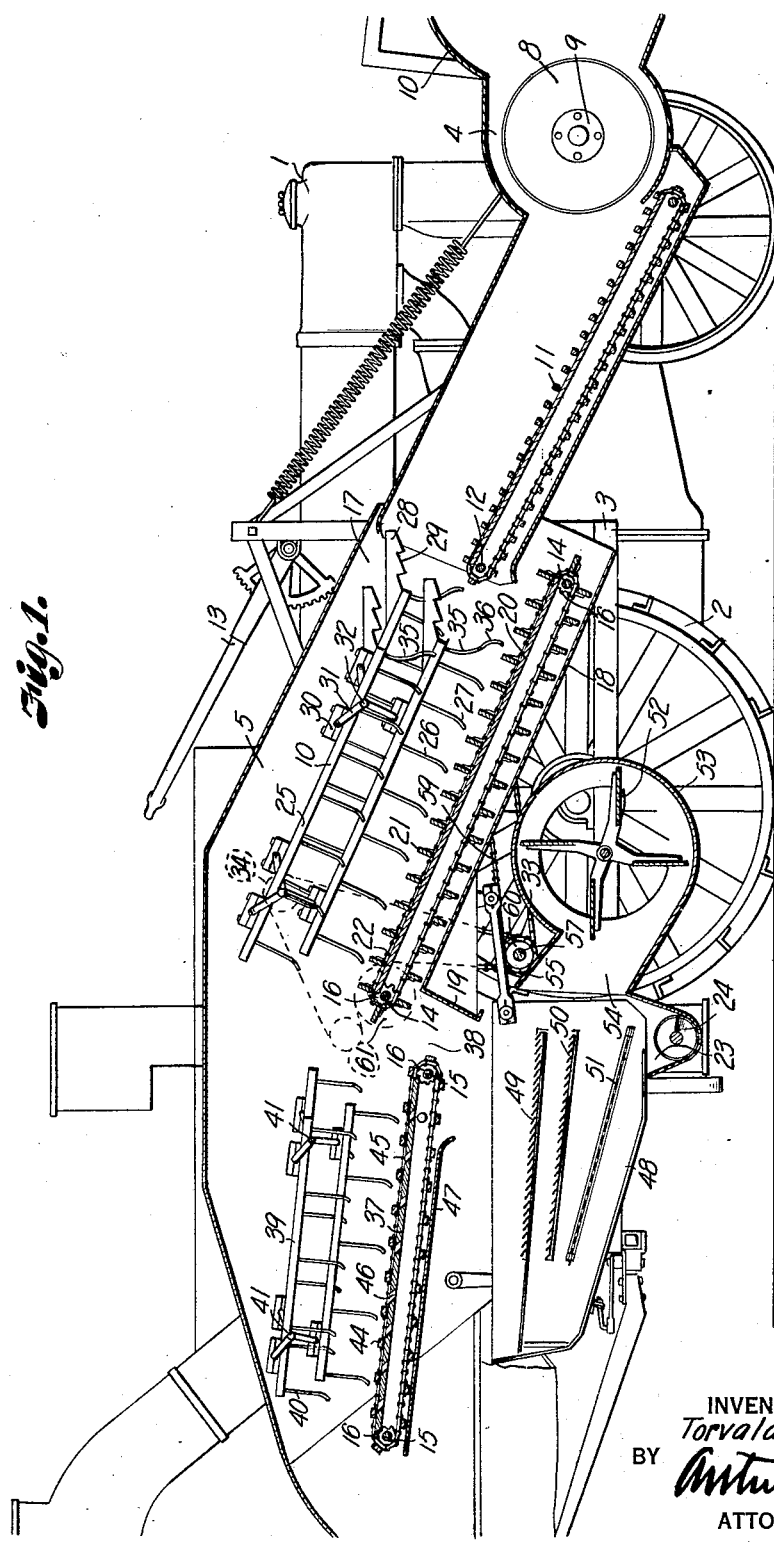
INVENTOR
Torvald N. Pierson
BY
Arthur P. Brown
ATTORNEY April 28, 1931. T. N. PIERSON 1,803,131
GRAIN SEPARATING MECHANISM
Filed Nov. 16, 1927 2 Sheets-Sheet 2
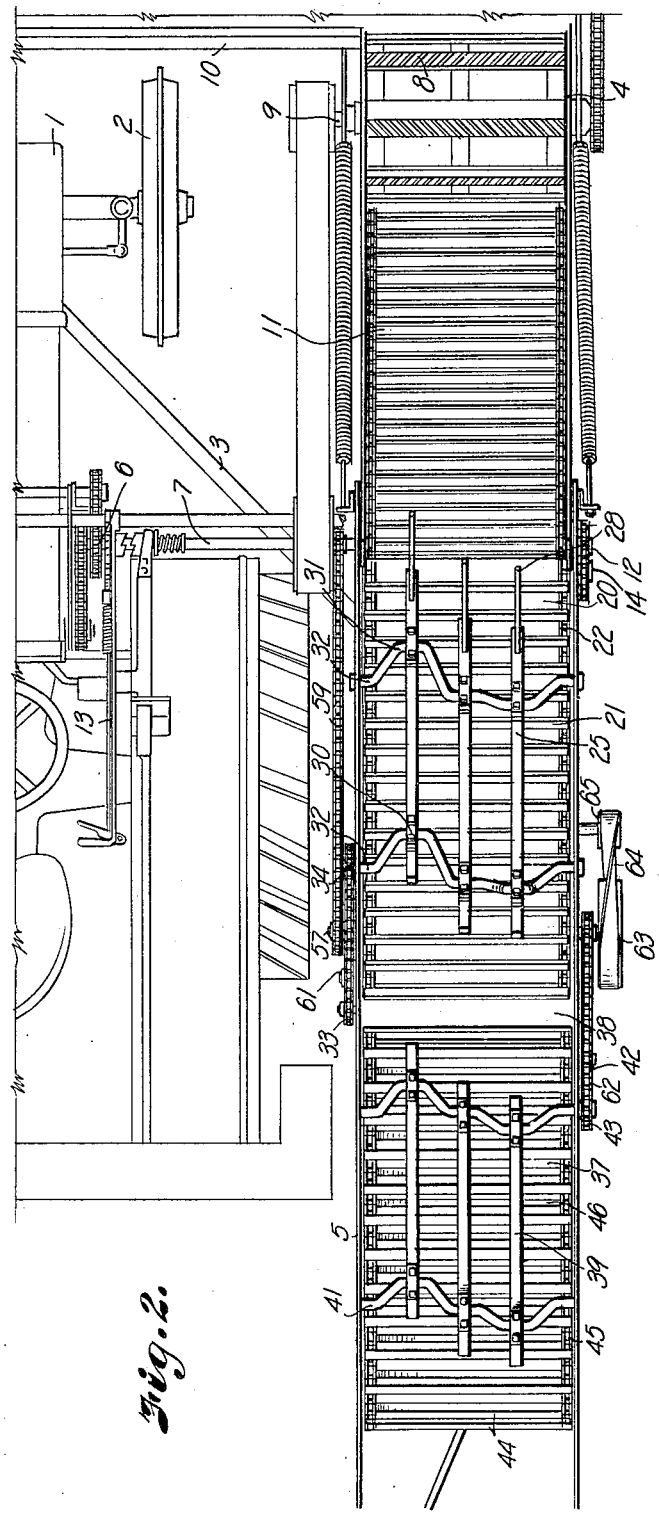
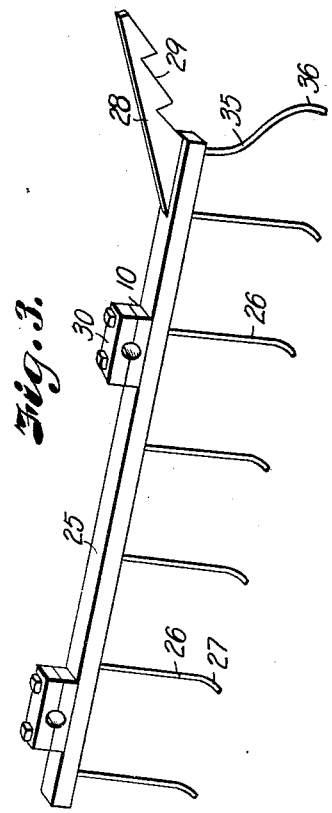
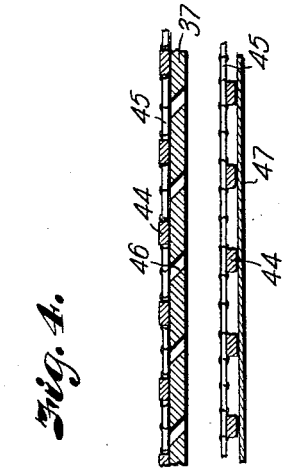
INVENTOR
Torvald N. Pierson
BY
ATTORNEY Patented Apr. 28, 1931

1,803,131

UNITED STATES PATENT OFFICE

TORVALD N. PIERSON, OF INDEPENDENCE, MISSOURI, ASSIGNOR TO THE GLEANER COMBINE HARVESTER CORPORATION, OF KANSAS CITY, MISSOURI, A CORPORATION OF DELAWARE

GRAIN-SEPARATING MECHANISM

Application filed November 16, 1927. Serial No. 233,583.

My invention relates to threshing machines and more particularly to that class of machines in which harvesting, threshing and separating mechanisms are associated and known as combines. The principal objects of the invention are to extract all the kernels from threshed material, to improve means for separating grain kernels from the straw and dirt of threshed material, to avoid discharge of straw from which kernels have not been removed, to control exactly the passage of straw through the separator, to provide for the advance of the straw in a substantially continuous column through the separating mechanism, and to control air blasts for efficient removal of chaff and dirt.

In accomplishing these and other objects of the invention I have provided improved details of structure, the preferred forms of which are illustrated in the accompanying drawings, wherein:

Fig. 1 is a longitudinal, vertical, sectional view of separating mechanism including translating and agitating elements embodying my invention shown functionally associated with adjacent elements in a combine.

Fig. 2 is a plan view of the same with the casing removed, showing particularly the translating and agitating elements.

Fig. 3 is an enlarged detail perspective view of one of the loose-material agitating elements having translating functions.

Fig. 4 is an enlarged detail sectional and fragmentary view of a kernel translating element similar to the view of the same element in the left hand portion of Fig. 1.

Referring in detail to the drawings:

1 designates a tractor having wheels 2 and provided with a frame 3 for supporting a thresher housing 4 and separator housing 5, the tractor being adapted as in ordinary practice to transport the housings to a work location and move them forward therein, and having power-transmission elements 6 connected with a transverse shaft 7 whereby it is adapted to actuate a thresher cylinder 8 on a shaft 9, and separator elements hereinafter described in the separator housing. The thresher cylinder receives kernel-carrying straw delivered by harvesting mechanism indicated by the housing portion 10, and delivers threshed material comprising straw, kernels, and straw loosely supporting kernels, to a so-called thresher raddle or conveyor 11 within the thresher housing, as in ordinary operation of the structural combination described and commonly designated a combine.

The thresher housing is pivotally mounted on a shaft 12, preferably aligned with the shaft 7 and its pivotal rear end extends into the forward end of the separator housing so that the thresher housing, and attached harvesting mechanism, may be adjusted to the height of the standing grain to suitably harvest the heads thereof, and the threshed material may be delivered by the thresher raddle through an enclosed connection to the separator housing. Means for pivoting the thresher housing includes a lever 13. Means for supporting and operating translating or conveying elements presently described and commonly called raddles, within the separator housing, include forward shafts 14 and rearward shafts 15 provided with sprockets 16 as in other machines of this character and which therefore need not be described in detail.

The separator housing 5 includes downwardly sloping forward portion 17 having a bottom plate 18 that extends rearwardly to a line adjacent the longitudinal center of the housing 5 and is provided with a substantially vertical depending wing or shield 19. Mounted transversely in the housing portion 17 adjacent the bottom plate 18 is a rack or table 20, positioned to receive threshed material from the thresher raddle on its forward end, the rear end of the table being substantially vertically in registry with the rear end of the plate. A moving continuous belt rake element consisting of slats 21 having ends fixed to chains 22 meshing with sprocket 16 of one shaft 14 is moved upwardly over the table to translate threshed material and particularly the kernels of threshed grain for delivery of separated kernels by gravity into the boot 23 of an elevator including a conveyor 24, located below the separator housing.

Means for drawing the loose or strawy component of the threshed material into the separator housing and advancing or translating it therein in a continuous and substantially integral loose mass or column, including means for forking or agitating the loose component, comprise a plurality of bars 25 extending longitudinally in the housing having depending tines or fingers 26 provided with rearwardly turned lower ends 27, and forwardly and upwardly extending grapples 28 having notches 29 in their lower edges, the several bars being respectively supported by journal blocks 30 on offset crank portions 31 of shafts 32 journaled in the housing. I have illustrated the forking and straw-translating means as comprising three bars supported by two shafts each having crank portions at 120 degree intervals, the shafts being rotated by a chain 33 running over a sprocket 34 on one end of the rearward shaft 32, the chain being moved through means presently described by the shaft 7, so that the three bars move in parallel vertical planes to cause the grappling members 28 to overlie the rear end of the thresher raddle successively to grasp and drag backward the loose material, and the fingers 26 of respective bars to successively grasp the loose material delivered to the separator translator and advance it, with lifting, loosening and forking movements, rearwardly of the housing portion 17. I provide also on each bar a forward particularly shaped finger 35 having a hooked end 36 adapted for cooperation with the grapples and the normal fingers to conduct the loose material into the course beneath the bars and adjacent the slats of the translator for engagement by the normal fingers.

Positioned transversely within the separator housing rearwardly of the table 20, is a grate 37, the forward end of which is spaced slightly horizontally from the rear end of the table 20 to provide a mouth 38 through which kernels may pass, the kernels flowing from the rear edge of the table to fall through a substantially unobstructed channel towards the elevator boot. The forward end of the grate is positioned lower than the rear end of the table so that it may receive by gravity loose material delivered from the table by the translating fingers 26.

Forking means similar to those provided for the forward portion of the housing, and comprising bars 39 having hooked tines or fingers 40 supported by shafts 41 actuatable by chain and sprocket elements 42 and 43, are positioned above and adjacent the grate for stirring and advancing the strawy material, and retaining the same in a substantially integral but loose mass for control of the strawy material, and dislodgment of kernels therefrom. A translating element or continuous belt-like rake consisting of relatively shallow slats 44 attached to chains 45 operable over the sprocket 16 of one shaft 15, moves the kernels deposited on the grate from the strawy material over the grate, the kernels dropping through the openings 46 thereof to a shelf 47 over which they are moved by the rake element during its return to grate-raking position, and discharged from the shelf into a chaffing shoe 48, having usual screens such as chaffer sieves 49 and 50, and a weed screen 51, the kernels being discharged by the shoe into the elevator boot.

An air blast element consisting of a fan 52 operably supported in a housing 53 having an outlet 54 discharges a current of air into the shoe and upwardly towards the grate 37, the upper lip 55 of the outlet being preferably adapted to control the current and particularly to restrain the current from passage through the said spacing channel 38 between the grate and the table, the wing 19 of the bottom plate 18 also shielding said channel, to prevent interference by air currents with the transfer of lose material from the table to the grate. The structure preferably provides for movement of the blast through the shoe and below the grate, the shelf shielding the rear portion of the grate, while part of the blast may move into and through a limited front portion of the grate.

The slots 46 of the grate 37 are preferably provided as downwardly forwardly slanting, for the purpose of preventing the entrance of straw thereinto.

The preferable means of suitably actuating the several separator elements include a counter shaft 57 positioned adjacent the fan housing, which is actuated by a chain 59 from the shaft 7; said chain 33 referred to as operating the forward forking element shafts 32 running over a sprocket 60 on said counter shaft 57 and also running over a sprocket 61 on the rear shaft 14 of the forward rake element. A chain 62 also actuated by the counter shaft 57 is associated with the forking element and the rake of the grate in a similar manner for actuating the same, and a pulley 63 on the counter shaft 57 carries a belt 64 running over a fan pulley 65 whereby the fan is actuated from said shaft.

In operating separating mechanism comprising elements provided and assembled as described, threshed material including kernels, dirt, and loose material comprising straw, chaff, and kernel-carrying straw or incompletely threshed fragments of heads, is delivered by the threshing conveyor to the mouth of the thresher housing, where the loose kernels drop to the table and are caught in the cells or chambers formed by the rake slats and moved over the table by the rake. The loose material is grappled at the mouth of the thresher housing by the grapples of the oscillating bars, and dragged forwardly and downwardly, the hooked terminal fingers cooperating to move the loose material into position for engagement by the slats of the rake and by the forking fingers. The loose material is lifted by the planetary fingers, moved rearwardly, and dropped, whereby kernels are shaken from the loose material to be received by the table. Attrition of the kernels due to movement by the slats over the table, serves to loosen hulls that may remain attached to kernels. The kernels are discharged over the rear end of the table for falling substantially directly into the elevator boot, and the loose material, having measurable cohesion, falls to the grate, is grasped by the fingers of the rear forking element, and is subjected to agitating effect thereof while being advanced over the grate by the fingers and by the grate.

Particular attention is called to structure and mode of operation of the forking and raking elements whereby substantially all of the loose material is moved in a continuous column and so is forced into engagement with the forking elements for agitation and tearing thereby; and to the cooperation of parts with reference to the air blast, whereby the blast is prevented from removing straw from the prescribed passage from the forward portion of the housing into engagement with the grate forks, and the blast is delivered to the shoe and is restrained by the return shelf from admission to the rearward end of the grate.

The stream of kernels falling from the table passes through the air blast, and dirt and chaff are cleaned therefrom, the kernels preferably being detained on the screens of the shoe that project over the elevator boot so that the stream of kernels is further cleaned of foreign material.

What I claim and desire to secure by Letters Patent is:

1. A grain separator including in combination with a threshing cylinder and a primary conveyor, a housing having an upwardly and rearwardly inclined forward floor portion, a secondary conveyor in said housing adjacent said floor portion having a receiving end below the delivery end of the primary conveyor, grain advancing mechanism including rakes for taking grain from the primary conveyor and forks for agitating and propelling the grain along the secondary conveyor, a delivery conveyor having a receiving end below and spaced longitudinally from the delivery end of the secondary conveyor, advancing mechanism, including oscillating forks, located above the delivery conveyor, a rearwardly and upwardly inclined table beneath the delivery conveyor, a shoe for receiving grain dropped from said floor and table, and a fan having a discharge conduit for directing a blast of air through the shoe and beneath the table.

2. A grain separator including in combination with a threshing cylinder and a primary conveyor, a housing having an upwardly and rearwardly inclined forward floor portion, a secondary conveyor in said housing adjacent said floor portion having a receiving end below the delivery end of the primary conveyor, grain advancing mechanism including a series of oscillating bars having hooks at their forward ends for raking grain from the primary conveyor and spaced fingers for raking the grain along the secondary conveyor, a delivery conveyor having a receiving end below and spaced longitudinally from the delivery end of the secondary conveyor, advancing mechanism, including oscillating forks, located above the delivery conveyor, a rearwardly and upwardly inclined table beneath the delivery conveyor, a shoe for receiving grain dropped from said floor and table, and a fan having a discharge conduit for directing a blast of air through the shoe and beneath the table.

In testimony whereof I affix my signature.

TORVALD N. PIERSON.